United States Patent
Modarres et al.

(10) Patent No.: US 10,031,582 B2
(45) Date of Patent: Jul. 24, 2018

(54) SYSTEMS AND METHODS FOR INDUCED ELECTROSTATIC HAPTIC EFFECTS

(71) Applicant: Immersion Corporation, San Jose, CA (US)

(72) Inventors: Ali Modarres, Montreal (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/297,012

(22) Filed: Jun. 5, 2014

(65) Prior Publication Data

US 2015/0355710 A1    Dec. 10, 2015

(51) Int. Cl.
*B60W 50/08*    (2012.01)
*G06F 3/01*    (2006.01)
*G09G 5/00*    (2006.01)

(52) U.S. Cl.
CPC .............. *G06F 3/016* (2013.01); *G09G 5/003* (2013.01); *G09G 2300/0404* (2013.01)

(58) Field of Classification Search
CPC . G06F 3/016; G06F 3/01; G06F 3/041; G06F 3/044; G06F 3/045; G06F 3/0488; G06F 1/16; G09G 5/003; G09G 2300/0404; G09G 5/00; H03K 17/00; H03K 17/96; G08B 6/00
See application file for complete search history.

(56) References Cited

U.S. PATENT DOCUMENTS

| | | | |
|---|---|---|---|
| 5,963,144 A | 10/1999 | Kruest | |
| 6,337,678 B1 | 1/2002 | Fish | |
| 6,506,605 B1 | 1/2003 | Allen et al. | |
| 6,819,312 B2 | 11/2004 | Fish | |
| RE42,064 E | 1/2011 | Fish | |
| 2002/0123325 A1 | 10/2002 | Cooper | |
| 2003/0105662 A1* | 6/2003 | Koketsu | G07B 15/063 705/13 |

(Continued)

OTHER PUBLICATIONS

Burgo et al (article from nature.com, titled "Friction coefficient dependence on electrostatic tribocharging", dated Aug. 12, 2013) is cited to disclose that friction is depending on the electrostatic charge.*

(Continued)

*Primary Examiner* — Kumar Patel
*Assistant Examiner* — Nguyen H Truong
(74) *Attorney, Agent, or Firm* — Kilpatrick Townsend & Stockton LLP (57) ABSTRACT

One illustrative system disclosed herein includes a processor configured to determine an ESF-based haptic effect and transmit a haptic signal associated with the ESF-based haptic effect. The illustrative system also includes an ESF controller in communication with the processor, the ESF controller configured to receive the haptic signal, determine an ESF signal based at least in part on the haptic signal, and transmit the ESF signal. Further, the illustrative system includes an inducing electrode configured to receive the ESF signal and induce an electric charge on an induced electrode, wherein the inducing electrode does not contact the induced electrode, and wherein the induced electrode is configured to output the ESF-based haptic effect to a surface.

25 Claims, 6 Drawing Sheets

(56) References Cited

U.S. PATENT DOCUMENTS

| | | | |
|---|---|---|---|
| 2003/0197612 A1 | 10/2003 | Tanaka et al. | |
| 2006/0054680 A1* | 3/2006 | Feldman | G07B 15/063 235/375 |
| 2006/0132302 A1 | 6/2006 | Stilp | |
| 2006/0286972 A1 | 12/2006 | Kates et al. | |
| 2007/0080806 A1 | 4/2007 | Lax et al. | |
| 2008/0218488 A1* | 9/2008 | Yang | G09G 3/20 345/173 |
| 2008/0248836 A1 | 10/2008 | Caine et al. | |
| 2008/0303670 A1 | 12/2008 | Seidel | |
| 2009/0079550 A1* | 3/2009 | Makinen et al. | 340/407.2 |
| 2009/0096632 A1 | 4/2009 | Ullrich et al. | |
| 2009/0132093 A1 | 5/2009 | Arneson et al. | |
| 2009/0270045 A1 | 10/2009 | Flaherty | |
| 2009/0281419 A1 | 11/2009 | Troesken et al. | |
| 2010/0141407 A1* | 6/2010 | Heubel | G06F 1/163 340/407.1 |
| 2010/0171715 A1* | 7/2010 | Peterson | G06F 3/016 345/173 |
| 2011/0050427 A1 | 3/2011 | Skjellerup et al. | |
| 2011/0051360 A1 | 3/2011 | Dabov et al. | |
| 2011/0109588 A1 | 5/2011 | Makinen et al. | |
| 2011/0285667 A1* | 11/2011 | Poupyrev | G06F 3/045 345/174 |
| 2012/0056002 A1 | 3/2012 | Ritamaki et al. | |
| 2012/0062371 A1 | 3/2012 | Radivojevic et al. | |
| 2012/0109083 A1 | 5/2012 | Coulthard | |
| 2012/0229401 A1* | 9/2012 | Birnbaum et al. | 345/173 |
| 2012/0287068 A1 | 11/2012 | Colgate | |
| 2012/0327006 A1* | 12/2012 | Israr | G06F 3/044 345/173 |
| 2013/0135223 A1 | 5/2013 | Shai | |
| 2013/0164543 A1* | 6/2013 | Shibuya | G06F 1/1643 428/428 |
| 2014/0077953 A1 | 3/2014 | Yang | |
| 2014/0333417 A1 | 11/2014 | Sun | |
| 2015/0061833 A1 | 3/2015 | Do et al. | |
| 2015/0070150 A1 | 3/2015 | Levesque et al. | |
| 2015/0123775 A1* | 5/2015 | Kerdemelidis | G08B 6/00 340/407.1 |
| 2015/0145656 A1 | 5/2015 | Levesque et al. | |
| 2015/0189403 A1 | 7/2015 | Magi | |
| 2015/0199955 A1* | 7/2015 | Draganic | G10K 15/02 381/86 |
| 2015/0355710 A1 | 12/2015 | Modarres et al. | |
| 2016/0019762 A1 | 1/2016 | Levesque et al. | |
| 2016/0034724 A1 | 2/2016 | Zumsteg | |
| 2016/0102483 A1 | 4/2016 | Luo | |
| 2016/0189492 A1 | 6/2016 | Hamam et al. | |

OTHER PUBLICATIONS

Lee et al., A Haptic Touchscreen Interface for Mobile Devices, ICMI '13 Proceedings of the 15th ACM on International Conference on Multimodal Interaction, pp. 311-312, 2013.

European Patent Office, Extended Search Report, Application No. 15169837 dated Oct. 30, 2015.

United States Patent and Trademark Office, Office Action, U.S. Appl. No. 14/322,701 dated Mar. 21, 2016.

U.S. Appl. No. 14/984,434, Non-Final Office Action dated Nov. 23, 2016.

U.S. Appl. No. 14/984,434, Final Office Action dated Mar. 8, 2017.

U.S. Appl. No. 14/984,434, Non-Final Office Action dated Jul. 6, 2017.

European Patent Office Application No. 16207392.8, Extended Search Report dated Apr. 18, 2017.

European Patent Office Application No. 15169837.0, Search Report dated Apr. 25, 2016.

Nakamura, Taku; "Multi-Finger Surface Visuo-Haptic Rendering Using Electrostatic Stimulation with Force-Direction Sensing Gloves"; Department of Precision Engineering; the University of Tokyo, Hongo 7-3-1, Bunky-ku, Tokyo 113-8656, Japan; 489-491; IEEE Haptics Symposium 2014; Feb. 23-26, 2014; Houston, TX.

Vitushinsky, Roman et al.; "Bistable Thin-Film Shape Memory Actuators for Applications in Tactile Displays", Journal of Microelectromechanical Systems; Feb. 2009; pp. 86-194; vol. 18, No. 1; IEEE Service Center, US.

European Patent Office Application No. 15169837.0, Communication Pursuant to Article 94(2) EPC dated Jan. 3, 2018, 5 pages.

* cited by examiner

SYSTEMS AND METHODS FOR INDUCED ELECTROSTATIC HAPTIC EFFECTS

FIELD OF THE INVENTION

The present invention relates to the field of user interface devices. More specifically, the present invention relates to induced electrostatic haptic effects.

BACKGROUND

As computer-based systems become more prevalent, the quality of the interfaces through which humans interact with these systems is becoming increasingly important. One interface that is of growing popularity due to its intuitive and interactive nature is the touchscreen display. Through a touchscreen display, a user can perform a variety of tasks by contacting a region of the touchscreen with the user's finger. In order to create a more intuitive and enhanced user experience, designers often leverage user experience with physical interactions. This is generally done by reproducing some aspects of interactions with the physical world through visual, audio, and/or haptic feedback. Haptic feedback often takes the of a mechanical vibration. There is a need for additional systems and methods to generate haptic feedback.

SUMMARY

Embodiments of the present disclosure comprise computing devices comprising induced electrostatic friction (ESF) actuators that generate surface-based haptic effects. In one embodiment, a system of the present disclosure may comprise a processor configured to determine an ESF-based haptic effect and transmit a haptic signal associated with the ESF-based haptic effect. The system may also comprise an ESF controller in communication with the processor, the ESF controller configured to receive the haptic signal, determine an ESF signal based at least in part on the haptic signal, and transmit the ESF signal. Further, the system may comprise an inducing electrode configured to receive the ESF signal and induce an electric charge on an induced electrode, wherein the inducing electrode does not contact the induced electrode, and wherein the induced electrode is configured to output the ESF-based haptic effect to a surface.

In another embodiment, a method of the present disclosure may comprise: determining an ESF-based haptic effect, transmitting a haptic signal associated with the ESF-based haptic effect to an ESF controller, determining an ESF signal based at least in part on the haptic signal, and transmitting the ESF signal associated with the ESF-based haptic effect to an inducing electrode configured to induce an electric charge on an induced electrode, wherein the inducing electrode does not contact the induced electrode. The method may further comprise outputting the ESF-based haptic effect to a surface. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Induced Electrostatic Haptic Effects

One illustrative embodiment of the present disclosure comprises a smartphone. The smartphone comprises a touchscreen display, a memory, and a processor in communication with each of these elements. The touchscreen display of the illustrative device comprises one or more sensors for determining the location of a touch relative to the display area, corresponding in this example to the screen of the smartphone.

In the illustrative embodiment, the smartphone comprises one or more haptic output devices configured to provide haptic effects to the user. At least one haptic output device comprises an induced ESF actuator, which outputs a haptic effect via electrostatic attraction.

In the illustrative embodiment, the induced ESF actuator comprises a first electrode (hereinafter the "inducing electrode") positioned beneath a second electrode (hereinafter the "induced electrode"), with space between the inducing and induced electrodes. The induced electrode is coupled to the back of the smartphone's touchscreen display. In such a system, the smartphone causes an electric signal, for example an AC signal, to be applied to the inducing electrode. The electric signal causes the inducing electrode to generate a charge on the induced electrode, which may create capacitive coupling with an object (e.g., the user's hand or a stylus) near or touching the surface of the touchscreen display. A user may then feel this capacitive coupling as a haptic effect comprising, for example, a change in the perceived coefficient of friction or a simulated texture on the surface of the touchscreen display.

In the illustrative embodiment, the induced ESF actuator outputs a haptic effect in response to an event. An event, as used herein, is any interaction, action, collision, or other event which occurs during operation of the device which can potentially comprise an associated haptic effect. In some embodiments, an event may comprise user input (e.g., interaction with a real or virtual button; manipulating a joystick; interacting with a touch surface; tilting or orienting a computing device; or bending, folding, twisting, stretching, or flexing a computing device), a system status (e.g., low battery, low memory, or a system notification, such as a notification generated based on the system receiving an incoming call), sending data, receiving data, or a program event (e.g., if the program is a game, a program event may comprise explosions, collisions or interactions between game objects, or advancing to a new level).

The description of the illustrative embodiment above is provided merely as an example, not to limit or define the limits of the present subject matter. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Induced Electrostatic Haptic Effects

Figure 1:
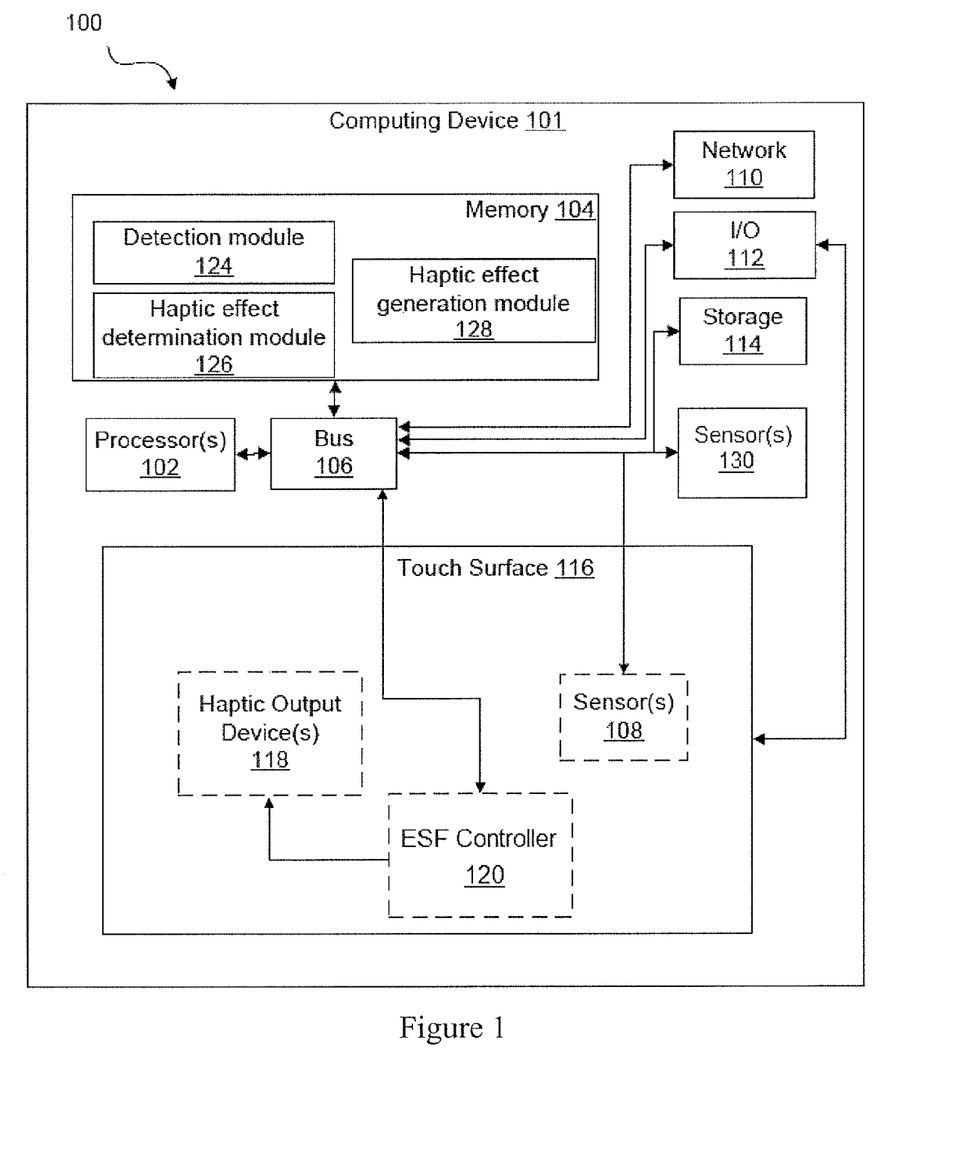
FIG. 1 is a block diagram showing a system for induced electrostatic haptic effects according to one embodiment.

FIG. 1 is a block diagram showing a system for induced electrostatic haptic effects according to one embodiment. In the embodiment shown, system 100 comprises a computing device 101 having a processor 102 in communication with other hardware via bus 106. Computing device may comprise, for example, a smartphone, tablet, or portable gaming device. While computing device 101 is shown as a single device in FIG. 1, in other embodiments, the computing device may comprise multiple devices, such as a game console and one or more game controllers. A memory 104, which can comprise any suitable tangible (and non-transitory) computer-readable medium such as RAM, ROM, EEPROM, or the like, embodies program components that configure operation of the computing device 101. In this example, computing device 101 further includes one or more network interface devices 110, input/output (I/O) interface components 112, and storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays, game controllers, keyboards, mice, speakers, microphones, and/or other hardware used to input data or output data. Storage 114 represents nonvolatile storage such as magnetic, optical, or other storage media included in device 101 or coupled to processor 102.

System 100 further includes a touch surface 116, which, in this example, is integrated into computing device 101. Touch surface 116 represents any surface that is configured to sense tactile input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure and/or the size of the contact surface area between a user's body and the touchscreen. As another example, optical sensors with a view of the touch surface 116 may be used to determine the touch position.

In other embodiments, the sensor 108 may comprise a LED detector. For example, in one embodiment, touch surface 116 comprises a LED finger detector mounted on the side of a display. In some embodiments, the processor 102 is in communication with a single sensor 108, in other embodiments, the processor is in communication with a plurality of sensors 108, for example, a first touch-screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

In some embodiments, sensor 108 and touch surface 116 may comprise a touch-screen or a touch-pad. For example, in some embodiments, touch surface 116 and sensor 108 may comprise a touch-screen mounted overtop of a display configured to receive a display signal and output an image to the user.

In the embodiment shown, computing device 101 comprises one or more additional sensors 130. The sensor 130 is configured to transmit sensor 130 signals to processor 102. In some embodiments, the sensor 130 may comprise a gyroscope, an accelerometer, a magnetometer, a global positioning (GPS) unit, a temperature sensor, an ambient light sensor, and/or other sensors for detecting motion, location, and/or environmental characteristics. In some embodiments, the processor 102 is in communication with a single sensor 130, in other embodiments, the processor 102 is in communication with a plurality of sensors 130, for example, a gyroscope and an accelerometer. Although sensor 130 is depicted in FIG. 1 as being internal to computing device 101, in some embodiments, the sensor 130 may be external to computing device 101. In some embodiments, an electronic device external to the computing device 101 (e.g., a second computing device 101) may comprise the sensor 130. In some embodiments, the electronic device may be configured to transmit signals from the sensor 130 to the processor 102 within the computing device 101.

Haptic output device 118 is configured to output an effect that can be sensed by a user. In some embodiments, haptic output device 118 is configured to output a haptic effect simulating a change in a perceived coefficient of friction or a texture on the touch surface 116 in response to an ESF signal. Haptic output device 118 may be rigid or flexible.

Haptic output device 118 comprises an induced ESF actuator. An induced ESF actuator comprises an inducing electrode and an induced electrode. The inducing electrode is configured to induce an electric field on the induced electrode. In some embodiments, the induced electrode may be coupled to the touch surface 116 and configured to output one or more haptic effects to the touch surface 116.

The induced and inducing electrodes comprise a conductive material, for example, copper, tin, iron, aluminum, gold, silver, carbon nanotubes (CNT), or indium tin oxide (ITO). As the conductivity of the induced and/or inducing electrode decreases, in some embodiments, the user may perceive a weaker haptic effect. In some embodiments, the induced and/or inducing electrode may be transparent. In some embodiments, the induced electrode may be coupled to ground. Further, in some embodiments, an insulator layer, an air gap, or both may be disposed between the inducing electrode and the induced electrode. Disposing an insulator layer, an air gap, or both between the inducing and induced electrodes may improve the safety of the haptic output device 118 by improving the electric isolation between the user's finger and the voltage carried through the inducing electrode. In some embodiments, the electric isolation may be improved by increasing the distance between the user's finger and the voltage carried through the inducing electrode. Further, in some embodiments, the electric isolation may be improved by introducing a dielectric material between the user's finger and the inducing electrode. In some embodiments, the insulator layer may comprise, for example, glass, porcelain, plastic, polymer, fiberglass, nitrogen, sulfur hexafluoride, or polyethylene terephthalate (PET).

In the embodiment shown in FIG. 1, the inducing electrode is communicatively coupled to ESF controller 120. ESF controller 120 is configured to receive a haptic signal from processor 102 and output an ESF signal to the haptic output device 118. The ESF signal comprises AC voltage from a power source. In some embodiments, the ESF signal may be associated with the haptic signal. In some embodiments, the ESF controller 120 may comprise one or more operational amplifiers, transistors, and/or other digital or analog components for amplifying signals. For example, in one embodiment, ESF controller 120 comprises a high-voltage amplifier. Further, in some embodiments, the ESF controller 120 may comprise a processor, a microcontroller, a multiplexer, a transistor, a field programmable gate array (FPGA), a flip-flop, and/or other digital or analog circuitry.

In some embodiments, processor 102 may output a haptic signal to the ESF controller 120. Based on this haptic signal, the ESF controller 120 outputs an ESF signal to haptic output device 118. The haptic output device 118 receives the ESF signal at the inducing electrode. As the ESF signal travels through the inducing electrode, it may induce a charge in the induced electrode. This charge may then create a capacitive coupling with an object on or near the surface of touch surface 116, providing the haptic effect.

In some embodiments, the surface of touch surface 116 may be smooth, but the haptic output device 118 may output an ESF haptic effect that produces an attractive force between parts of the body or an object near the surface of touch surface 116. In such an embodiment, the attractive force may stimulate the nerve endings in the skin of a user's finger or components in a stylus that can respond to the induced ESF actuator. The nerve endings in the skin, for example, may be stimulated and sense the induced ESF actuator (e.g., the capacitive coupling) as a vibration or some more specific sensation. For example, in one such embodiment, as the user moves his or her finger across the touch surface 116, the induced electrode capacitively couples with his or her finger, and the user may sense a texture or a perceive a change in a coefficient of friction on the touch surface 116. In some embodiments, varying the levels of attraction between the induced electrode and an object on or near touch surface 116 can vary the haptic effect perceived by the user and/or the perceived coefficient of friction.

In some embodiments, haptic output device 118 may comprise an ESF actuator of the type described above in addition to other kinds of haptic output devices. For example, in some embodiments, haptic output device 118 may further comprise actuators configured to vibrate the surface of touch surface 116 or other parts of computing device 101, e.g., the housing of computing device 101. In such an embodiment, an induced ESF actuator may also output a haptic effect, for example, a haptic effect configured to change a perceived coefficient of friction on the surface of touch surface 116.

In still other embodiments, haptic output device 118 may output additional haptic effects by vibrating touch surface 116 or the housing of computing device 101 at different frequencies. For example, haptic output device 118 may comprise one or more of a piezoelectric actuator, an electric motor, an electro-magnetic actuator, a voice coil, a shape memory alloy, an electro-active polymer, a solenoid, an ERM, or a linear resonant actuator (LRA). Further, some haptic effects may utilize an actuator coupled to a housing of the device, and some haptic effects may use multiple actuators of the same or different types in sequence and/or in concert. Although a single haptic output device 118 is shown here, embodiments may use multiple haptic output devices 118 of the same or different type to produce haptic effects.

Turning to memory 104, illustrative program components 124, 126, and 128 are depicted to illustrate how a device can be configured in some embodiments to provide induced electrostatic haptic effects. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure and/or other characteristics of the touch over time.

Haptic effect determination module 126 represents a program component that analyzes data regarding touch characteristics to select a haptic effect to generate. Particularly, module 126 may comprises code that determines, based on the location of the touch, a haptic effect to output to the surface of the touch surface and code that selects one or more haptic effects to provide in order to simulate the effect. In some embodiments, the haptic effect may comprise an electrostatic haptic effect. For example, some or all of the area of touch surface 116 may be mapped to a graphical user interface. Different haptic effects may be selected based on the location of a touch in order to simulate the presence of a feature by simulating a texture on a surface of touch surface 116 so that the feature is felt when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed). In some embodiments, haptic effect determination module 126 may determine haptic effects based on other kinds of events, for example, other kinds of user input (e.g., a button press, joystick manipulation, and/or tilting or moving the computing device 101), game activity (e.g., a gunshot, an explosion, jumping, falling, or completing a level or mission), background system 100 activity, and/or system 100 status notifications (e.g., low battery, low memory, a network connection problem, or a problem with hardware or software).

Haptic effect generation module 128 represents programming that causes processor 102 to generate and transmit a haptic signal to ESF controller 120 to generate the selected electrostatic haptic effect at least when a touch is occurring. For example, generation module 128 may access stored waveforms or commands to send to ESF controller 120. As another example, haptic effect generation module 128 may receive a desired type of texture and utilize signal processing algorithms to generate an appropriate signal to send to ESF controller 120. As a further example, a desired texture may be indicated along with target coordinates for the texture and an appropriate waveform sent to ESF controller 120 to generate the texture in the appropriate location. Some embodiments may utilize multiple haptic output devices 118 in concert to simulate a feature. For instance, a variation in texture may simulate crossing a boundary between a virtual button on an interface while a vibration effect simulates the response when the button is pressed.

Figure 2:
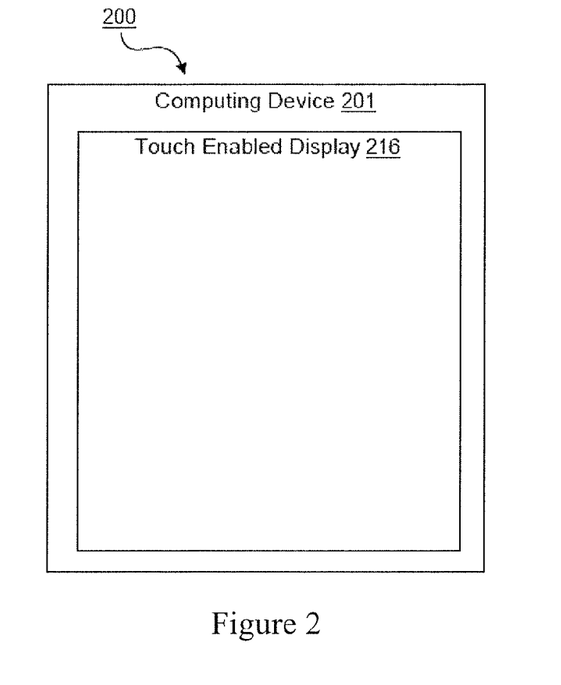
FIG. 2 shows another embodiment of a system for induced electrostatic haptic effects.

A touch surface may or may not overlay (or otherwise correspond to) a display, depending on the particular configuration of the system 100. For example, FIG. 2 shows another embodiment of a system for induced electrostatic haptic effects. Computing device 201 includes a touch enabled display 216 that combines a touch surface and a display of the device. The touch surface may correspond to the display exterior or one or more layers of material above the actual display components.

Figure 3:
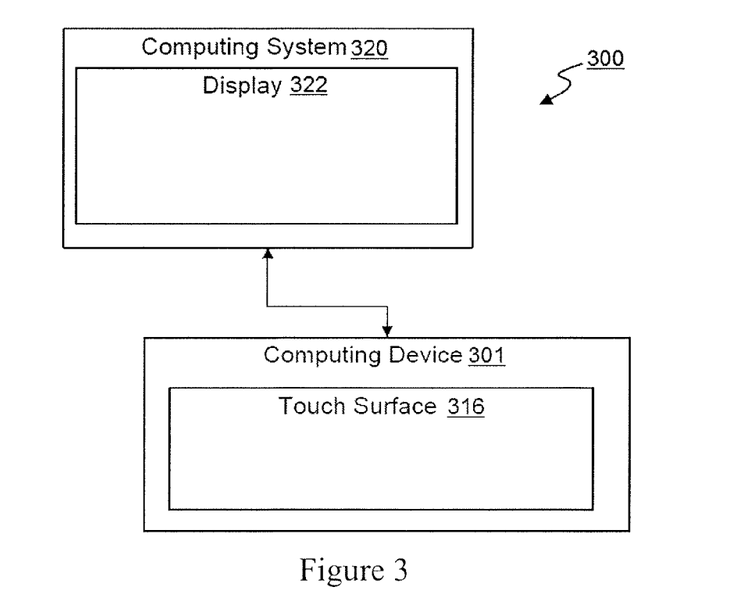
FIG. 3 shows a system for induced electrostatic haptic effects according to one embodiment.

FIG. 3 shows a system for induced electrostatic haptic effects according to one embodiment. In this example, the touch surface 316 does not overlay a display 322. Rather, the computing device 301 comprises a touch surface 316 which may be mapped to a graphical user interface provided in a display 322 that is included in computing system 320 interfaced to device 301. For example, computing device 301 may comprise a mouse, trackpad, or other device, while computing system 320 may comprise a desktop or laptop computer, set-top box (e.g., DVD player, DVR, cable television box), or another computing system. As another example, touch surface 316 and display 322 may be disposed in the same device, such as a touch enabled trackpad in a laptop computer comprising display 322. Whether integrated with a display 322 or otherwise, the depiction of planar touch surfaces 316 in the examples herein is not meant to be limiting. Other embodiments include curved or irregular touch surfaces 316 that are further configured to provide surface-based haptic effects.

Figure 4:
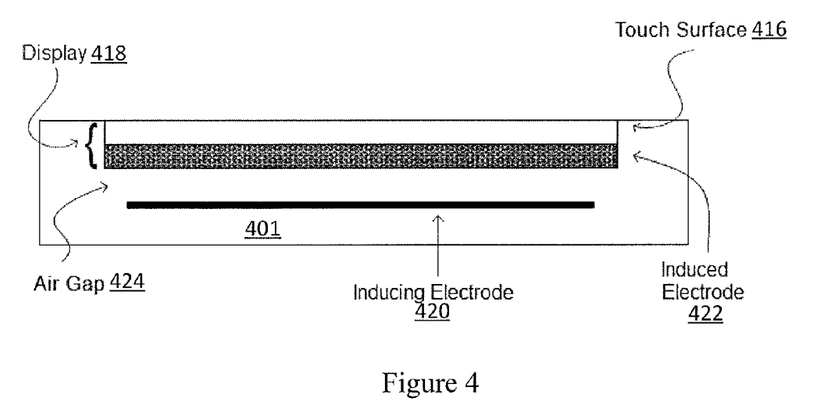
FIG. 4 shows one embodiment of a system for induced electrostatic haptic effects.

FIG. 4 shows one embodiment of a system for induced electrostatic haptic effects. In this example, computing device 401 comprises a touch enabled display 418. Computing device 401 may be configured similarly to computing device 101 of FIG. 1, though components such as the processor, memory, sensors, and the like are not shown in this view for purposes of clarity.

Computing device 401 comprises a touch surface 416 and an induced electrode 422. In some embodiments, a display 418 comprises the touch surface 416 and the induced electrode 422. In other embodiments, the touch surface 416 and the induced electrode 422 may be coupled directly to the display 418, such as a layer of material on top of display 418. In this example, the area of the display 418 corresponds to the touch surface 416, though the same principles could be applied to a touch surface 416 completely separate from the display 418.

Computing device 401 comprises an inducing electrode 420 not in contact with the induced electrode 422, and configured to induce an electric charge on the induced electrode 422. In the example shown in FIG. 4, the inducing electrode 420 is positioned below the induced electrode 422. However, in other embodiments, the inducing electrode 420 may be positioned above or to the side of the induced electrode 422. In some embodiments, an air gap 424 may be between the inducing electrode 420 and the induced electrode 422. In other embodiments, an insulator may be disposed between the inducing electrode 420 and the induced electrode 422. In still other embodiments, there may be both an air gap and one or more insulators disposed between the inducing electrode 420 and the induced electrode 422. In some embodiments, the inducing electrode 420 may be coupled to the housing of device 401.

Figure 5:
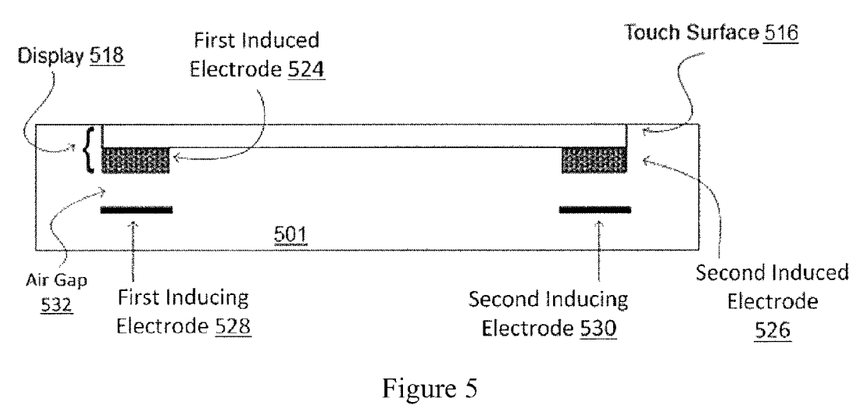
FIG. 5 shows a system for induced electrostatic haptic effects according to another embodiment.

In some embodiments, as shown in FIG. 5, computing device 501 may comprise multiple induced electrodes 524 and 526 coupled to the touch surface 516 at different locations, as well as multiple inducing electrodes 528 and 530 for inducing charges in the multiple induced electrodes 524 and 526. This configuration may allow many electrostatic haptic effects to be output to the touch surface 516 at different locations.

In one such embodiment, computing device 501 may comprise a first induced electrode 524 positioned below the left side of the touch surface 516 and a second induced electrode 526 positioned below the right side of the touch surface 516. In such an embodiment, a first inducing electrode 528 and a second inducing electrode 530 may be positioned below the first and second induced electrodes 524 and 526, respectively, with an air gap 532 or other insulator between the induced electrodes 524 and 526 and the inducing electrodes 528 and 530. As a user interacts with the touch surface, computing device 502 may determine and output one or more ESF haptic effects.

For example, in some embodiments, these electrostatic haptic effects may comprise a texture on the left side of the touch surface 516 and a perceived increase in a coefficient of friction on the right side of the touch surface 516. In such embodiments, the computing device's 501 ESF controller may output a first ESF signal to the first inducing electrode 528 in order to induce a first charge on the first induced electrode 524, and a second ESF signal to the second inducing electrode 530 in order to induce a second charge on the second induced electrode 526. The induced charges may couple the first and second induced electrodes 524 and 526 with conductive parts of a user's finger. As the user interacts with the touch surface 516 and moves his or her finger along the touch surface 516, the user may perceive a texture on the left side of the touch surface 516 and/or a change in a coefficient of friction on the right side of the touch surface 516.

Figure 6:
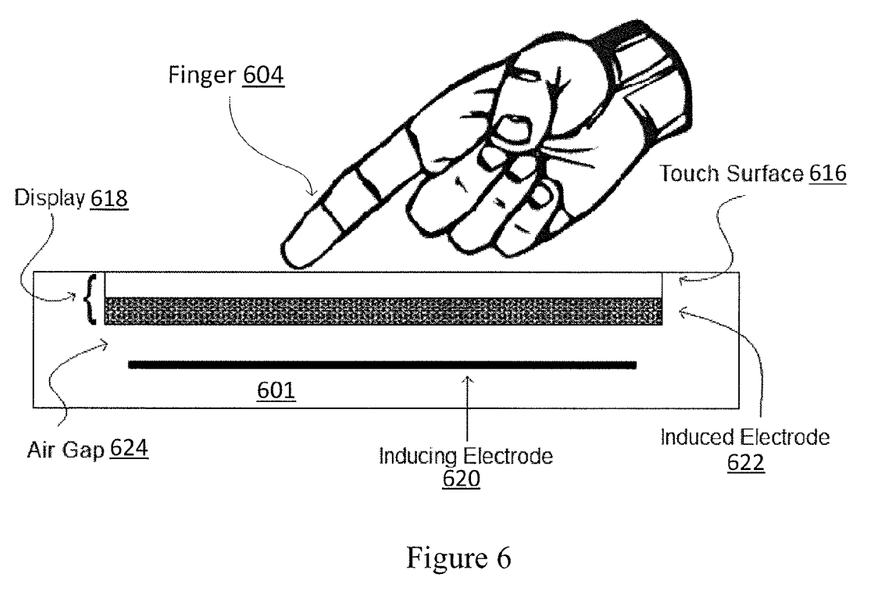
FIG. 6 shows a user interaction with a system for induced electrostatic haptic effects according to one embodiment.

FIG. 6 shows a user interaction with a system for induced electrostatic haptic effects according to one embodiment. As shown in FIG. 6, display 618 comprises a touch surface 616 and an induced electrode 622. Further, computing device 601 comprises an inducing electrode 620 not in contact with the induced electrode 622 and configured to induce an electric charge on the induced electrode 622. In some embodiments, computing device 601 also comprises an air gap 624 or another insulator between the inducing electrode 620 and the induced electrode 622. Disposing an air gap 624, an insulator, or both between the inducing electrode 620 and the induced electrode 622 may improve the safety of the computing device 601 by improving the electric isolation between the user's finger 604 and the voltage carried through the inducing electrode 620. In some embodiments, the electric isolation may be improved by increasing the distance between the user's finger 604 and the voltage carried through the inducing electrode 620. Further, in some embodiments, the electric isolation may be improved by introducing a dielectric material between the user's finger 604 and the inducing electrode 620.

In some embodiments, as the user interacts with the touch surface 616, computing device 601 may determine and output an ESF haptic effect. For example, in one such embodiment, the display 618 may output a button as part of a GUI. As the user interacts with the button by placing his or her finger 604 over the button's location on the touch surface 616, the computing device 601 may determine an ESF haptic effect. For example, in one embodiment, this haptic effect comprises an increase in the perceived coefficient of friction on the touch surface 616. In one such embodiment, computing device 620 may output a haptic signal to an ESF controller, which then outputs an ESF signal to the inducing electrode 620 based on the haptic signal. In other embodiments, computing device 620 may output a haptic signal directly to the inducing electrode 620. Based on the ESF or haptic signal, the inducing electrode 620 may induce an electric charge on the induced electrode 622. In one such embodiment, the induced electric charge on the induced electrode 622 may capacitively couple the user's finger 604 to the touch surface 616, creating an electrostatic haptic effect simulating a perceived increase in a coefficient of friction on the surface of touch surface 616.

Illustrative Methods for Induced Electrostatic Haptic Effects

Figure 7:
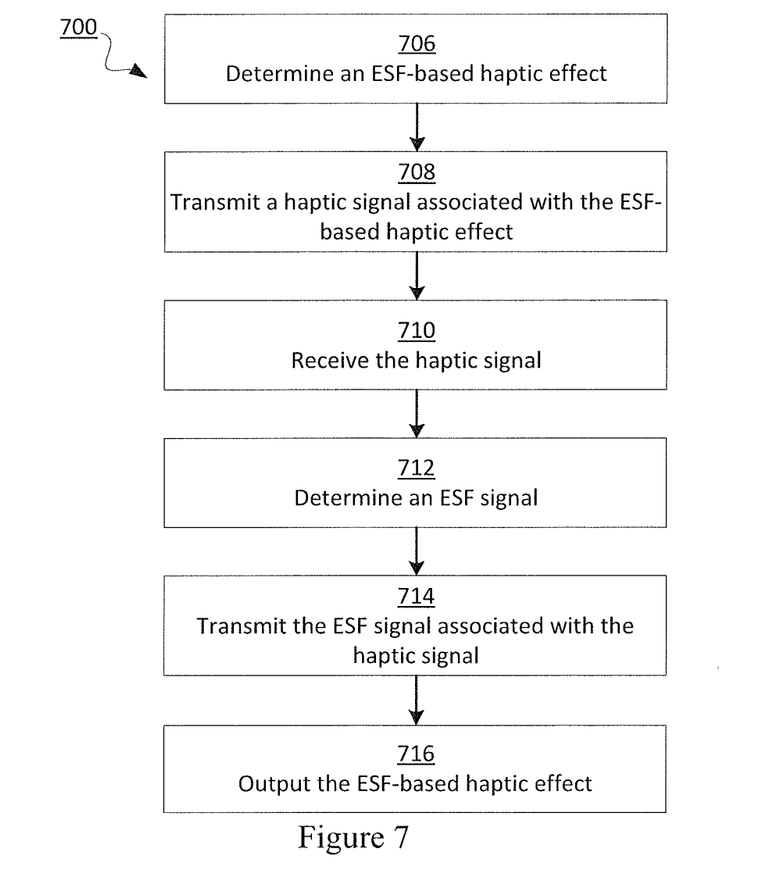
FIG. 7 is a flow chart of steps for performing a method for induced electrostatic haptic effects according to one embodiment.

FIG. 7 is a flow chart of steps for performing a method for induced electrostatic haptic effects according to one embodiment. In some embodiments, the steps in FIG. 7 may be implemented in program code that is executed by a processor, for example, the processor in a general purpose computer, a mobile device, or a server. In some embodiments, these steps may be implemented by a group of processors. In some embodiments one or more steps shown in FIG. 7 may be omitted or performed in a different order. Similarly, in some embodiments, additional steps not shown in FIG. 7 may also be performed. The steps below are described with reference to components described above with regard to system 100 shown in FIG. 1.

The method 700 begins at step 706 when processor 102 determines an ESF-based haptic effect. In some embodiments, the ESF-based haptic effect comprises a simulated texture or a perceived change in a coefficient of friction.

In some embodiments, the processor 102 may rely on programming contained in haptic effect determination module 126 to determine the electrostatic haptic effect to output to haptic output device 118. For example, in some embodiments, haptic effect determination module 126 may comprise a lookup table. In one such embodiment, specific user inputs may be associated with particular electrostatic haptic effects. For example, in one embodiment, in response to typing the word "friction" on a virtual keyboard on the touch surface 116, the haptic effect determination module 126 associates an ESF-based haptic effect wherein the haptic output device 116 increases the perceived coefficient of friction at the touch surface 116.

In some embodiments, processor 102 may determine an ESF-based haptic effect based in part on a user interaction with the touch sensitive surface 116. In some embodiments, sensor 108 may comprise one or more of a plurality of sensors known in the art, for example, resistive and/or capacitive sensors may be embedded in touch sensitive surface 116 and used to determine the location of a touch and other information, such as pressure. Upon detecting an interaction, sensors 108 may send a signal associated with that interaction to processor 102. The sensor 108 signal may comprise data associated with the speed, pressure, or direction, of the user interaction, which processor 102 may use at least in part to determine a haptic effect. In some embodiments, processor 102 may determine a haptic effect based in part on a user interaction with a real or virtual button, a joystick, and/or tilting or moving computing device 101. For example, in some embodiments, processor 102 may determine a haptic effect based on a user pressing a button comprising a perceived increase in a coefficient of friction.

In some embodiments, processor 102 may determine the ESF-based haptic effect based in part on a signal from a sensor 130 configured to detect one or more of motion, orientation, a GPS location, an amount of ambient light, a temperature, or whether a user is in contact with the computing device 101. For example, in one embodiment, processor 102 associates a user tilting computing device 101 with an ESF-based haptic effect comprising a perceived increase in a coefficient of friction.

In some embodiments, the lookup table may comprise data associated with features of a user interface and a plurality of available haptic effects. For example, in one such embodiment, the lookup table comprises data associated with user interactions with a user interface, such as sliding a user's finger over a virtual button, and a plurality of available ESF-based haptic effects. For example, in such an embodiment, in response to a user sliding a finger over a virtual button, the processor 102 may consult the lookup table and associate an ESF-based haptic effect to be output by the haptic output device 118 wherein the perceived coefficient of friction at touch surface 116 is increased. In some embodiments, the plurality of available ESF-based haptic effects may comprise a plurality of textures. For example, the plurality of textures may comprise one or more of the textures of: sand, glass, ice, rubber, water, or any other available texture. For example, in one embodiment, a specific texture is associated with a button, for example, a glass texture. In such an embodiment, the processor 102 may consult the lookup table and determine an ESF-based haptic effect wherein the perceived coefficient of friction on the surface of touch surface 116 is decreased to create the feel of a glass button.

In other embodiments, processor 102 may use activity associated with an electronic game (e.g., a game played on a tablet, computer, or dedicated gaming system such as a console) to determine a haptic effect. For example, in some embodiments, an ESF-based haptic effect may be associated with the virtual terrain that a character in the game is passing over. For example, in one embodiment, an ESF-based haptic effect is associated with sand over which the character in the video game is walking. In such an embodiment, the processor 102 may determine an ESF-based haptic effect wherein the perceived coefficient of friction on the surface of touch surface 116 is increased to create the feel of sand.

In some embodiments, processor 102 may use a system status message, a system notification, and/or other events to determine a haptic effect. For example, a system status message, such as low battery or low memory, or a system notification, such as a notification generated based on the system receiving an incoming call, may be associated with particular ESF-based haptic effects. In one such embodiment, upon the system receiving an incoming call, processor 102 may consult the haptic effect determination module 126 and associate an incoming call notification with an ESF-based haptic effect comprising a simulated vibration.

In some embodiments, the processor 102 may apply data from a user input to an algorithm to determine an ESF-based haptic effect. For example, in one such embodiment, a user may input a number as part of a game. In response, the processor 102 determines an ESF-based haptic effect wherein the haptic output device 118 increases a perceived coefficient of friction at the surface of touch surface 116 in an amount that is inversely proportional to the size of a number the user input.

Further, in some embodiments, users may have "haptic profiles" wherein a user can determine and save in memory 104 a "profile" of the haptic effects the user would like associated with particular events. For example, in some embodiments, a user can select from a list of options which haptic effect the user would like associated with a button on a user interface. In such embodiments, the list may comprise, for example, ESF-based haptic effects such as high coefficient of friction, low coefficient of friction, patterned changes in the coefficient of friction, or textures such as bumpy, rubbery, or smooth. In such an embodiment, the processor 102 may consult with the user's haptic profile to determine which ESF-based haptic effect to generate. For example, if the user's haptic profile associates interaction with the button with a texture, such as smooth, in response to the user placing his or her finger over the button, processor 102 may determine an ESF-based haptic effect wherein the user perceives a low coefficient of friction on the surface of touch surface 116.

The method 700 continues at step 708 when processor 102 transmits a haptic signal associated with the ESF-based haptic effect. Processor 102 may transmit the haptic signal to an ESF controller 120. In some embodiments, the processor 102 may access drive signals stored in memory 104 and associated with particular ESF-based haptic effects. In one embodiment, a signal is generated by accessing a stored algorithm and inputting parameters associated with an effect. For example, in such an embodiment, an algorithm may output data for use in generating a drive signal based on amplitude and frequency parameters. As another example, a haptic signal may comprise data to be decoded by an actuator. For instance, the actuator may itself respond to commands specifying parameters such as amplitude and frequency.

The method 700 continues at step 710 when the ESF controller 120 receives the haptic signal. In some embodiments, the haptic signal may comprise a digital signal. In other embodiments, the haptic signal may comprise an analog signal. In some such embodiments, the ESF controller 120 may perform analog-to-digital conversion.

The method 700 continues at step 712 when the ESF controller 120 determines an ESF signal. In some embodiments, the ESF controller 120 may determine an ESF signal based at least in part on the haptic signal.

In some embodiments, the ESF controller 120 may comprise a processor or a microcontroller. The processor or microcontroller may rely on programming contained in memory to determine the ESF signal to output to haptic output device 118. In some embodiments, the programming contained in the memory may comprise a lookup table. In some embodiments, the processor or microcontroller may use the lookup table to associate a haptic signal with an ESF signal to output. For example, in some such embodiments, the ESF controller 120 may use a lookup table to associate a haptic signal with an ESF signal comprising an amplified, inverted, or frequency-shifted version of the haptic signal. In other embodiments, the programming contained in the memory may comprise an algorithm. In some such embodiments, the processor or microcontroller may determine the ESF signal by applying data from the haptic signal to the algorithm.

In some embodiments, the ESF controller 120 may comprise a crystal oscillator, a relay, a multiplexer, an amplifier, a switch, and/or other means for generating an ESF signal. In some embodiments, the ESF controller 120 may comprise a switch coupling the inducing electrode of the haptic output device 118 to a high voltage source. In such an embodiment, the haptic signal may cause ESF controller 120 to oscillate the switch, such that an ESF signal comprising high voltage is transmitted to the inducing electrode in a pattern configured to generate the desired ESF-based haptic effect. In still other embodiments, the ESF controller 120 may comprise a multiplexer coupling one or more inducing electrodes in haptic output device 118 to a high voltage source. Based on the haptic signal, the ESF controller 120 may control the multiplexer such that an ESF signal comprising high voltage is transmitted to the inducing electrodes in a pattern configured to generate the desired ESF-based haptic effect.

The method 700 continues at step 714 when ESF controller 120 transmits an ESF signal associated with the haptic signal to haptic output device 118. In some embodiments, the ESF controller 120 may output, as the ESF signal, an amplified, frequency-shifted, or inverted version of the haptic signal to the inducing electrode in the haptic output device 118. In some embodiments, the ESF controller 120 may output high voltage as the ESF signal to haptic output device 118. In some embodiments, the ESF controller 120 may access drive signals stored in memory and associated with particular ESF-based haptic effects or haptic signals. In one embodiment, a signal is generated by accessing a stored algorithm and inputting parameters associated with an effect. For example, in such an embodiment, an algorithm may output data for use in generating a drive signal based on amplitude and frequency parameters. As another example, an ESF signal may comprise data to be decoded by the actuator. For instance, the actuator may itself respond to commands specifying parameters such as amplitude and frequency.

The method 700 continues at step 716 when haptic output device 118 outputs the ESF-based haptic effect. In some embodiments, the ESF-based haptic effect comprises a simulated vibration, a simulated texture, or a change in a perceived coefficient of friction.

Haptic output device 118 comprises an inducing electrode and an induced electrode, with space between the inducing and the induced electrodes. The ESF signal comprises an electric signal that is applied to the inducing electrode, which charges the inducing electrode. The electric signal is an AC signal that, in some embodiments, may be generated by a high-voltage amplifier. Applying an electric signal to the inducing electrode may cause the inducing electrode to induce a charge on the induced electrode. Induction, or more specifically electrostatic induction, may occur when a charged object is brought near an uncharged, electrically conductive object in which there are an equal number of protons and electrons. The charged object, depending on how it's charged, may attract either the protons or the electrons in the uncharged object, causing the protons and the electrons to separate. This separation may negatively charge one region of the uncharged object and positively charge another region of the uncharged object; i.e. induce charges. For example, in some embodiments, the ESF signal may charge the inducing electrode (the "charged object") so that it induces a charge on the induced electrode (the "uncharged object"). Because the induced electrode may be electrically conductive and uncharged in its rest state, in some embodiments, it may be subject to induced charges. In some embodiments, the charge induced on the induced electrode may capacitively couple an object, such as a user's finger, to the touch surface 116. The capacitive coupling may, in some embodiments, result in the user perceiving the haptic effect.

Additional Embodiments of Systems for Induced Electrostatic Haptic Effects

Figure 8:
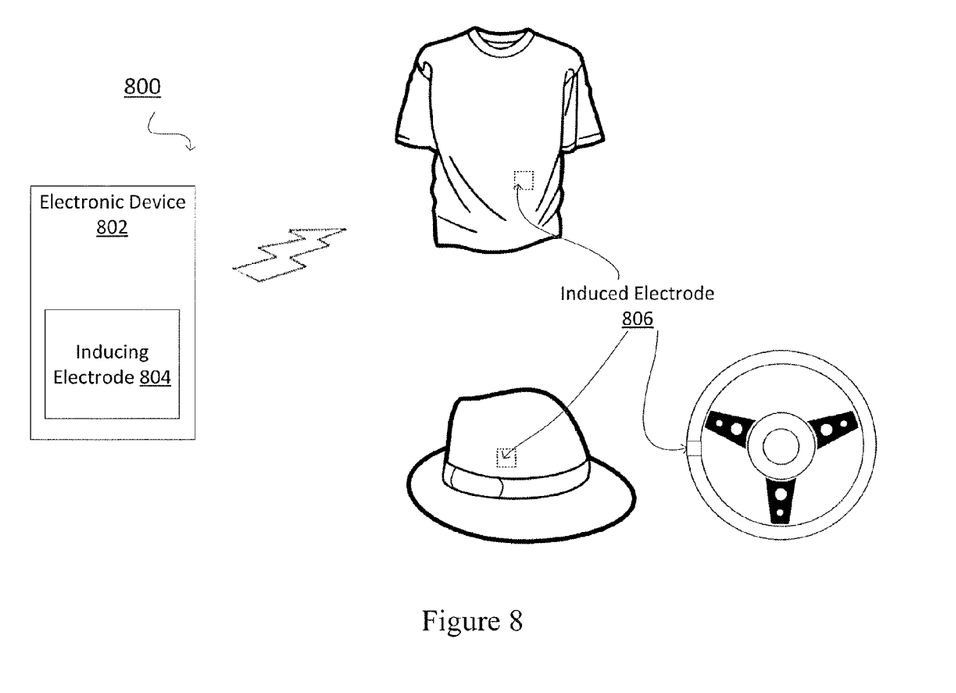
FIG. 8 shows a system for induced electrostatic haptic effects according to another embodiment.

FIG. 8 shows a system for induced electrostatic haptic effects according to another embodiment. System 800 comprises an electronic device 802. The electronic device 802 may comprise, for example, a desktop computer, laptop computer, kiosk, smartphone, tablet, e-reader, alarm system, medical device, pen, game system, portable game system, or television. The electronic device 802 comprises an inducing electrode 804. In some embodiments, the inducing electrode 804 may be configured to generate an electrostatic field within a radius of the inducing electrode 804.

The system 800 further comprises an induced electrode 802. In some embodiments, the induced electrode 802 may be associated with a wearable or graspable device. For example, in some embodiments, the induced electrode 802 may be associated with hats, sleeves, jackets, collars, glasses, gloves, rings, articles of clothing, jewelry, game system controllers, steering wheels, other mobile devices, mobile device holders, tablets, e-readers, laptops, gamepads, joysticks, and/or gear shifters.

In some embodiments, the electronic device 802 may cause an electric signal, for example an AC signal, to be applied to the inducing electrode 804. The electric signal causes the inducing electrode 804 to generate an electrostatic filed. In some embodiments, if the induced electrode 806 is within the range of the electrostatic field, the inducing electrode 804 may generate a charge on the induced electrode 806. The charge on the induced electrode 806 may create capacitive coupling with an object (e.g., a user's body part, for example, their arm, leg, chest, head, hand, back, or finger) near or touching the surface of the induced electrode 806. A user may feel this capacitive coupling as a haptic effect comprising, for example, a simulated vibration or a simulated texture on the surface of the induced electrode 806.

In some embodiments, the strength of the haptic effect perceived by the user may depend on the distance between the inducing electrode 804 and the induced electrode 806. For example, in some embodiments, as the distance between the inducing electrode 804 and the induced electrode 806 decreases, the user may perceive a haptic effect with increasing strength. In some embodiments, if the induced electrode 806 is not within the range of the electrostatic field generated by the inducing electrode 806, the user may not feel a haptic effect.

In some embodiments, the system 800 may output a haptic effect upon the occurrence of an event (e.g., completing a game level). In some embodiments, an event may comprise an induced electrode 806 entering within the range of an electrostatic field generated by an inducing electrode 804. For example, in some embodiments, a user may be wearing an article of clothing (e.g., a hat) comprising an induced electrode 806. An inducing electrode 804 may be positioned, for example, in the store that manufactured the article of clothing worn by the user. An electronic device 802 may be applying an electric signal to the inducing electrode 806, which may generate an electrostatic field. As a user enters within the range of the electrostatic field generated by the inducing electrode 806, the inducing electrode 804 may generate a charge on the induced electrode 806. The charge on the induced electrode 806 may create capacitive coupling with the user's body (e.g., the user's head). The user may perceive this capacitive coupling as a haptic effect. In some embodiments, as the distance between the user and the inducing electrode 804 decreases (e.g., if the user enters the store), the user may perceive a stronger haptic effect.

As another example, in some embodiments, an induced electrode 806 may be associated with a graspable device, for example, a car steering wheel. A user may drive the car down the highway while grasping the steering wheel, for example, to navigate. In some embodiments, an inducing electrode 804 may positioned, for example, at points along the highway. For example, in some embodiments, the inducing electrode 804 may be positioned at a toll station. An electronic device 802 may be applying an electric signal to the inducing electrode 806, which may generate an electrostatic field. As a user enters within the range of the electrostatic field generated by the inducing electrode 806, the inducing electrode 804 may generate a charge on the induced electrode 806. The charge on the induced electrode 806 may create capacitive coupling with the user's hand. The user may perceive this capacitive coupling as a haptic effect. In some embodiments, the haptic effect may alert the user to information, for example, that the user must pay a toll.

Advantages of Induced Electrostatic Haptic Effects

There are numerous advantages to induced electrostatic haptic effects. For example, such systems may be safer for a user than traditional ESF-based actuators. Traditional ESF-based actuators may comprise an electrode carrying more than 100 volts of electricity with only a single insulator between the user and the electrode. Further, the insulator is typically thin to allow the user to feel the ESF effect. Should the insulator fail, the user may be directly exposed to high voltage. Conversely, induced ESF actuators may comprise a first insulator, an electrode (i.e. the induced electrode), and a second insulator (or a second insulator and an air gap) between the user and the high voltage, allowing the user to be farther away from, and further electrically insulated from, the high voltage.

Further, in some embodiments, induced ESF haptic output devices may be easier to implement than traditional ESF-based haptic output devices. Traditionally, a touch surface may comprise an electrode that is used as both a touch input sensor and to output ESF haptic effects. A multiplexer, transistors, and/or other hardware may be used to switch the electrode between input and output modes. When configured to output, the switching hardware may couple the electrode with a high voltage source for producing an ESF haptic effect. When configured to input, the switching hardware may decouple the electrode from the high voltage source. Conversely, in some embodiments, such switching hardware may not be necessary because there may be no need to switch between input and output modes. In some embodiments, an induced electrode may be configured to detect user input only, while an inducing electrode may induce an electric charge on the induced electrode in order to output an ESF haptic effect, without any need to directly couple the induced electrode to a high voltage source.

In some embodiments, induced ESF actuators may be positioned on devices previously unable to provide haptic feedback. For example, embodiments may be positioned on the surfaces of pens, socks, rings, sleeves, gear shifters, or virtually any other wearable or graspable device to provide haptic feedback. Providing haptic feedback in such embodiments may provide a multitude of benefits, for example by allowing users to interact with devices without having to visually focus on the devices, which may increase overall user satisfaction.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICS), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
    an inducing electrode positioned on a first device, the first device being positionable at a position along a road;
    a power source in communication with the inducing electrode; and
    a processor in communication with the power source and configured to:
        determine an electrostatic force (ESF)-based haptic effect, and
        cause the power source to transmit a signal configured to cause the inducing electrode to generate an inductive coupling with an induced electrode positioned on a second device that is remote from and movable relative to the first device, the inductive coupling configured to cause the induced electrode to output the ESF-based haptic effect to a surface of the second device, wherein the second device is a component of a vehicle.

2. The system of claim 1, wherein the surface comprises a visual display positioned on the second device.

3. The system of claim 2, wherein the first device is positioned at a toll station.

4. The system of claim 1, wherein the inducing electrode is coupled beneath a first insulator, the first insulator comprising a solid material or a liquid material.

5. The system of claim 1, wherein the component of the vehicle is a gear shifter.

6. The system of claim 1, wherein the ESF-based haptic effect is configured to vary a perceived coefficient of friction on the surface.

7. The system of claim 1, wherein component of the vehicle is a steering wheel.

8. The system of claim 1, wherein the haptic effect is configured to provide an alert related to a toll.

9. A method comprising:
   determining, by a first device positionable at a position along a road, an electrostatic force (ESF)-based haptic effect; and
   generating, by the first device, an inductive coupling between an inducing electrode positioned on the first device and an induced electrode positioned on a second device that is remote from and moveable relative to the first device, the inductive coupling configured to cause the induced electrode to output the ESF-based haptic effect to a surface of the second device,
   wherein the second device is a component of a vehicle.

10. The method of claim 9, wherein the ESF-based haptic effect is configured to vary a perceived coefficient of friction on the surface.

11. The method of claim 9, wherein the induced electrode is coupled to a touch surface, and the induced electrode and the touch surface are disposed within a visual display.

12. The method of claim 9, wherein the second device is a steering wheel.

13. The method of claim 9, wherein the second device is a gear shifter.

14. A non-transient computer readable medium comprising program code, which when executed by a processor is configured to cause the processor to:
   determine an electrostatic force (ESF)-based haptic effect; and
   transmit a signal configured to cause an inducing electrode positioned on a first device to generate an inductive coupling with an induced electrode positioned on a second device that is remote from and moveable relative to the first device, the inductive coupling configured to cause the induced electrode to output the ESF-based haptic effect to a surface of the second device, wherein the first device is positionable at a position along a road; and
   wherein the second device is a component of a vehicle.

15. The non-transient computer readable medium of claim 14, wherein the induced electrode is coupled to a first insulator disposed within a visual display of the second device.

16. The non-transient computer readable medium of claim 14, wherein the second device is a steering wheel.

17. The non-transient computer readable medium of claim 15, wherein the second device is a gear shifter.

18. The non-transient computer readable medium of claim 14, wherein the ESF-based haptic effect is configured to vary a perceived coefficient of friction on the surface.

19. The method of claim 9, wherein the second device is positioned at a toll station.

20. A device comprising:
   a surface positioned to be contacted by a user; and
   a first electrode coupled to the surface and positioned to output a haptic effect to the surface in response to an inductive coupling between the first electrode and a second electrode that is positionable at a position along a road, the second electrode being remote from and movable relative to the device;
   wherein the surface is part of a component of a vehicle.

21. The device of claim 20, wherein the second electrode is positioned at a toll station.

22. The device of claim 20, wherein the second electrode is positioned on a remote device, and wherein the haptic effect is determined by the remote device and configured to convey information determined by the remote device.

23. The device of claim 20, wherein the surface is a touch-sensitive surface and the first electrode is positioned beneath the touch-sensitive surface and internal to the device.

24. The device of claim 20, wherein the first electrode is electrically disconnected from electrical components of the device.

25. The method of claim 9, wherein the second device is a steering wheel or a gear shifter, the position along the road is a toll station, and the ESF-based haptic effect is configured to provide an alert related to a toll.

* * * * *